US006757532B1

(12) United States Patent
Haartsen (10) Patent No.: US 6,757,532 B1
(45) Date of Patent: Jun. 29, 2004

(54) PERMISSIBLE OPERATING MODE DETERMINATION IN A DUAL-MODE RADIO

(75) Inventor: Jacobus Haartsen, Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 09/650,686

(22) Filed: Aug. 30, 2000

(51) Int. Cl.$^7$ ............................................. H04M 3/42
(52) U.S. Cl. .............................. 455/414.1; 455/67.11; 455/67.13; 455/423
(58) Field of Search ............................. 455/67.1, 67.3, 455/67.6, 41, 423, 424, 414, 522

(56) References Cited

U.S. PATENT DOCUMENTS

| | | | | |
|---|---|---|---|---|
| 4,955,083 A | * | 9/1990 | Phillips et al. ................ | 455/47 |
| 5,507,008 A | * | 4/1996 | Kanai et al. ................ | 455/512 |
| 5,818,820 A | * | 10/1998 | Anderson et al. ........... | 370/280 |
| 5,896,375 A | | 4/1999 | Dent et al. ................... | 370/347 |
| 5,926,501 A | * | 7/1999 | Souissi et al. .............. | 375/131 |
| 5,966,661 A | * | 10/1999 | Bernardin et al. ........... | 455/446 |
| 6,219,343 B1 | * | 4/2001 | Honkasalo et al. ......... | 370/335 |
| 6,330,462 B1 | * | 12/2001 | Chen .......................... | 455/572 |
| 6,430,395 B2 | * | 8/2002 | Arazi et al. ................ | 455/41.2 |
| 6,496,700 B1 | * | 12/2002 | Chawla et al. ........... | 455/435.2 |
| 6,519,460 B1 | * | 2/2003 | Haartsen ..................... | 455/452 |
| 6,571,103 B1 | * | 5/2003 | Novakov .................... | 455/464 |
| 6,603,748 B1 | * | 8/2003 | Lu et al. ...................... | 370/329 |
| 2002/0034170 A1 | * | 3/2002 | Tiedemann et al. ........ | 370/335 |

FOREIGN PATENT DOCUMENTS

| | | |
|---|---|---|
| EP | 1067728 A2 | 1/2001 |
| WO | WO9810568 | 3/1998 |
| WO | WO9914897 | 3/1999 |
| WO | WO0111833 A1 | 2/2001 |

OTHER PUBLICATIONS

Fabrizion Talucci et al., "MACA–BI (MACA By Invitation) – A Wireless MAC Protocol for High Speed ad hoc Networking", DEE –Politecnico de Bari, Bari, Italy.

K.Y. Eng et al, "A Wireless Broadband Ad–Hoc ATM Local–Area Network", ACM/Balzer Wireless Networks Journal, May 1995, pp. 1–34.

A. Wolisz et al., "Wireless Access To High Speed Networks", Institut für Fernmeldetechnik Technische Universität Berlin, pp. 1–21.

* cited by examiner

Primary Examiner—William Trost
Assistant Examiner—Sharad Rampuria
(74) Attorney, Agent, or Firm—Burns, Doane, Swecker & Mathis, L.L.P.

(57) ABSTRACT

It is determined whether a first kind of communication link, such as a high speed link, can be supported between a first unit and a second unit, wherein the first kind of communication link does not support a transmission range above a first maximum value. This is done by using a second kind of communication link, such as a low speed link, to determine a propagation loss value between the first unit and the second unit, wherein the second kind of communication link supports the transmission range above the first maximum value. Then, the propagation loss value is used to determine whether the first kind of communication link can be supported between the first unit and the second unit. The first and second units can be a master and slave in a piconet. Alternatively, they can both be slaves in a piconet.

26 Claims, 5 Drawing Sheets

| | MASTER TX POWER (dBm) |
|---|---|
| SLAVE 120 | +20 |
| 130 | -5 |
| 140 | +18 |
| 150 | +5 |

TABLE 210

FIG. 2b

| | RSSI (dBm) |
|---|---|
| SLAVE 120 | -60 |
| 130 | -49 |
| 140 | -52 |
| 150 | -50 |

TABLE 220

FIG. 3

| | PROPAGATION LOSS (dB) |
|---|---|
| SLAVE 120 | +80 |
| 130 | +44 |
| 140 | +70 |
| 150 | +55 |

TABLE 310

PERMISSIBLE OPERATING MODE DETERMINATION IN A DUAL-MODE RADIO

BACKGROUND

The present invention relates to radio communication systems, and more particularly to radio systems deploying different air interfaces for short-range/high-rate communications, and long-range/low-rate communications.

In recent decades, progress in radio and Very Large Scale Integrated circuit (VLSI) technology has fostered widespread use of radio communications in consumer applications. Portable devices, such as mobile radios, can now be produced having acceptable cost, size and power consumption. Although wireless technology is today focused mainly on voice communications (e.g., with respect to handheld radios), this field will likely expand in the near future to provide greater information flow to and from other types of nomadic devices and fixed devices. More specifically, it is likely that further advances in technology will provide very inexpensive radio equipment which can be easily integrated into many devices. This will reduce the number of cables currently used. For instance, radio communication can eliminate or reduce the number of cables used to connect master devices with their respective peripherals. The aforementioned radio communications will require an unlicenced band with sufficient capacity to allow for high data rate transmissions. A suitable band is the Industrial, Scientific and Medical (ISM) band at 2.4 GHz, which is globally available. The band provides 83.5 MHZ of radio spectrum.

To allow different radio networks to share the same radio medium without coordination, signal spreading is usually applied. In fact, the Federal Communications Commission (FCC) in the United States currently requires radio equipment operating in the 2.4 GHz band to apply some form of spreading when the transmit power exceeds about 0 dBm. Spreading can either be at the symbol level by applying direct-sequence (DS) spread spectrum techniques, or at the channel level by applying Frequency Hopping (FH) spread spectrum techniques. The latter is attractive for the radio applications mentioned above because it more readily allows the use of cost-effective radios. A system called BLUETOOTH™ has recently been introduced to provide pervasive connectivity, especially between portable devices like mobile phones, laptop computers, Personal Digital Assistants (PDAs), and other nomadic devices. This system applies frequency hopping to enable the construction of low-power, low-cost radios with a small footprint. The system supports both data and voice. The latter is optimized by applying a robust voice coding in combination with fast frequency hopping with a nominal rate of 1600 hops/s through the entire 2.4 GHz ISM band. The system concept includes piconets consisting of a master device and a limited number of slave devices sharing the same 1 MHz channel. With its maximum output power of 20 dBm, it covers areas with radii up to about 100–200 m. Over this extended range, a maximal data rate of 1 Mb/s can be supported.

When the BLUETOOTH™ system operates with output powers above 0 dBm, power control becomes mandatory. This power control is based on a closed-loop control as is described in U.S. patent application Ser. No. 09/156,695 entitled "Automatic Power Control in Uncoordinated FH Radio Systems," filed Sep. 18, 1998 which is hereby incorporated herein by reference in its entirety. At the receiver, the signal strength is measured. The transmitter is then requested to increase or decrease the transmitter power level so that the received power level falls within a certain power window. Power control based on received signal strength indication compensates for path loss, not for interference. This type of power control is preferred in uncoordinated ad-hoc systems because it reduces mutual interference.

For applications demanding higher data rates, the system can be extended with a high-speed mode. A description of a possible air interface for this high-speed mode is presented in U.S. patent application Ser. No. 09/385,024 entitled "Resource management in uncoordinated FH systems," filed Aug. 30, 1999 which is hereby incorporated herein by reference in its entirety. Since increasing the bit rate has the effect of reducing the energy per bit, either the power has to increase, or the range must be decreased. Increasing the power is limited by radio implementation, current consumption, and also by governmental regulations. The FCC allows high-power radios to operate with transmit powers exceeding 0.75 mW in the 2.4 GHz band, but in these cases requires the radios to apply spread spectrum techniques. DS spreaders are not cost or power efficient, nor is implementation trivial at high bit rates because the necessary chip rates increase tremendously. FH spreaders are limited to rates of 1–2 Mb/s because of the bandwidth restriction of 1 MHz. Therefore, only those high-rate modes operating at low power (i.e., below 0.75 mW) are considered, because at low power, the use of spreading techniques is not required. The use of low power, however, puts restrictions on the range. This means that two dual-mode radios that want to switch from the low-speed mode to the high-speed mode have to be sufficiently close to one another. Yet, because the low-rate connection covers larger ranges and is used for connection establishment, for two units that connect at the low-rate, it is unclear whether a high-speed connection can be supported between them as well.

There is therefore a need for methods and apparatuses that enable a dual-mode radio to assess whether a high-speed connection is feasible.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that determine whether a first kind of communication link can be supported between a first unit and a second unit, wherein the first kind of communication link does not support a transmission range above a first maximum value. This is accomplished by using a second kind of communication link to determine a propagation loss value between the first unit and the second unit, wherein the second kind of communication link supports the transmission range above the first maximum value. Then, the propagation loss value is used to determine whether the first kind of communication link can be supported between the first unit and the second unit. As examples, the first kind of communication link may be a high speed link, and the second kind of communication link may be a low speed link.

In another aspect, using the propagation loss value to determine whether the first kind of communication link can be supported between the first unit and the second unit can comprise using the propagation loss value and a maximum transmission power level associated with the first maximum value to estimate a received signal strength value. It is then determined that the first kind of communication link cannot be supported between the first unit and the second unit if the estimated received signal strength value is below a predetermined value. Otherwise, it is determined that the first kind of communication link can be supported between the first unit and the second unit if the estimated received signal strength value is not below the predetermined value.

In some applications of the invention, the first kind of communication link may be one that does not include use of spread spectrum techniques, and the second kind of communication link may be one that does include use of a spread spectrum technique.

In another aspect of the invention, using the second kind of communication link to determine the propagation loss value between the first unit and the second unit can comprise, in the first unit, measuring a received signal strength value of a signal transmitted by the second unit. The propagation loss value between the first unit and the second unit is then determined as a function of the measured received signal strength value and a transmission power level used by the second unit.

In some embodiments, the first unit may be a master unit and the second unit may be a slave unit. The master unit and the slave unit may communicate in accordance with BLUETOOTH™ standards.

In other embodiments, the first unit is a first slave unit in a piconet, and the second unit is a second slave unit in the piconet. The signal transmitted by the second unit in these cases is transmitted to a master unit in the piconet. In such embodiments, the step of, in the first unit, measuring the received signal strength value of the signal transmitted by the second unit can comprise, in the first unit, receiving a first packet transmitted by the master unit; and determining whether a packet address included in the first packet identifies the second slave unit. Then, the received signal strength value of a second packet transmitted in a next time slot is conditionally measured if the packet address included in the first packet identifies the second slave unit.

The piconet may operate in accordance with BLUETOOTH™ standards.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters. As used herein, the terms "master" and "slave" refer to electronic equipment, including portable radio communication equipment. The term "portable radio communication equipment" includes all mobile radio terminal equipment such as mobile telephones, pagers, communicators (i.e., electronic organizers, smartphones and the like). The term "portable radio communication equipment" also refers to any other type of electronic equipment that includes radio communication equipment, such as PDAs and laptop computers equipped with BLUETOOTH™-compliant communication equipment.

The various aspects of the invention will now be described in greater detail in connection with a number of exemplary embodiments. To facilitate an understanding of the invention, many aspects of the invention are described in terms of sequences of actions to be performed by elements of a system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention enables a system to utilize dual-mode radios that can communicate either at high data rates covering only short distances, or at low data rates covering longer distances. The connections between units may be established through the low rate system giving maximum range. At low rate, adaptive power control is applied to minimize interference to others. When operation at higher rates is desired, the units determine what rates can be supported from a radio implementation point of view. In one aspect of the invention, power control parameters, established during operation at the low data rate, are used to decide whether the propagation path allows a high-rate connection. In another aspect of the invention, the units are ordered to transmit at fixed power levels so that Received Signal Strength Indication (RSSI) measurements directly give an indication of the propagation losses, which in turn is used to decide whether the propagation path allows a high-rate connection. These and other aspects of the invention will now be described in greater detail.

Figure 1:
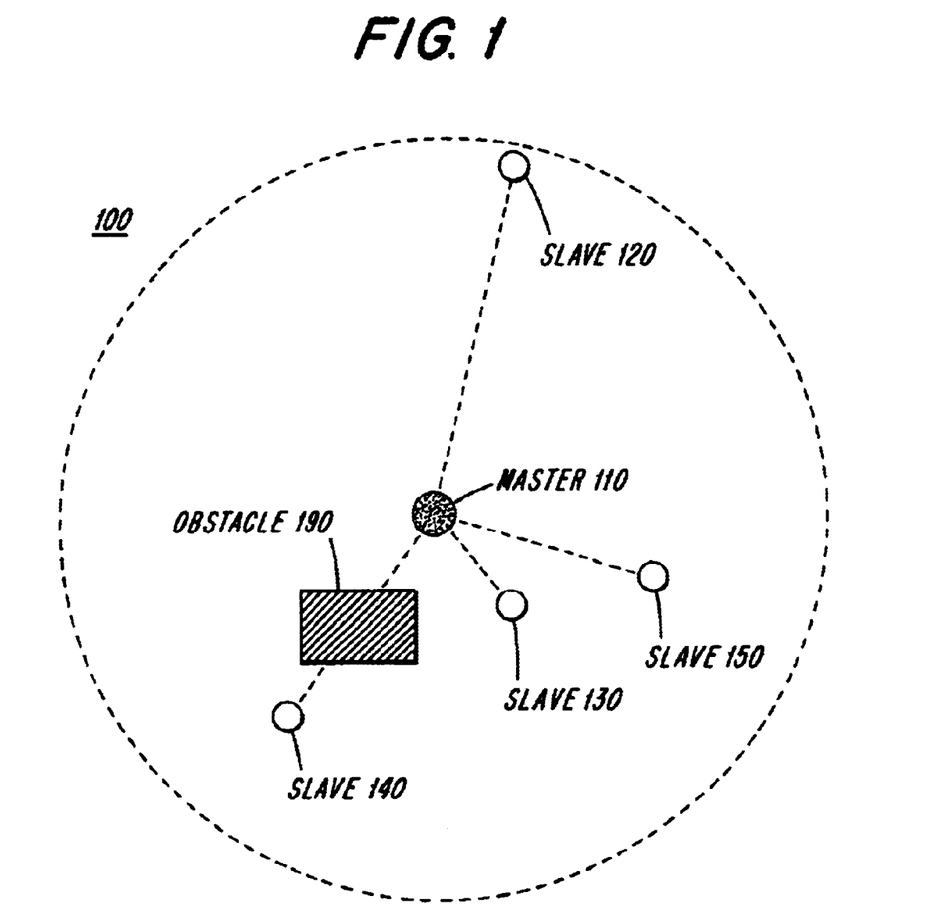
FIG. 1 is a block diagram of a piconet configuration including one master and several slaves supported by BLUETOOTH™ connections.

A preferred embodiment of the system described herein utilizes the FH radio interface as described in U.S. Pat. No. 5,896,375 ("Short-range radio communications system and method of use," by P. W. Dent and J. C. Haartsen), filed Jul. 23, 1996 which is hereby incorporated herein by reference in its entirety. This referenced patent describes an air interface that is based on the transmission of short packets on a frequency-hopping channel. This air interface has been the basis for a new air interface named BLUETOOTH™, which is intended to provide unlimited radio connectivity between devices of any kind. The BLUETOOTH™ concept includes a piconet which is created on a FH channel. One of the units on the channel is the master and the other units are slaves. Any unit can take on the master role or the slave role. The role is assigned when the piconet is established. By default, the unit that initiates the communications (i.e., creates the piconet) is the master. The master controls all traffic over the FH channel. In the piconet, a star configuration is used, like the piconet 100 illustrated in FIG. 1. Of course, it will be immediately recognized that neither the number of units nor the particular locations of units illustrated in FIG. 1 is essential to the invention. Rather, more or fewer units could be used in a piconet configuration, and these could be situated in virtually any location with respect to one another, so long as they are physically capable of communicating with one another, as further described below. As illustrated in FIG. 1, the master 110 is the center of the star: all communications flow via the master. When a slave joins a piconet, it is temporarily assigned a slave address. The slave address is included in the packets exchanged between the slave and the master. As explained in the above-referenced with U.S. Pat. No. 5,896,375, the piconet FH channel uses time slots. Each slot is on a different frequency, and is long enough to permit the transmission of a single packet. In alternating slots, the master transmits a packet to a particular slave and then receives a packet from this particular slave. A polling scheme is applied that enables two slaves to avoid transmitting simultaneously: Only the slave that is addressed in the master-to-slave slot is allowed to respond in the following slave-to-master slot. Each packet comprises an access code, a header, and a payload.

The access code identifies the FH channel to be used by the piconet. Each piconet uses a different access code, with the access code being derived from the identity of the master unit. All packets on the same FH channel carry the same access code. In addition to channel identification, the access code is used for frequency and timing recovery.

The packet header carries general control information, for example, to identify the payload and for error correction mechanisms.

Finally, the payload contains data or voice information.

In the BLUETOOTH™ system, the hop rate is 1600 hops/s. This results in time slots of 625 µs length. The type of modulation used is Gaussian Frequency Shift Keying (GFSK), with a data rate of 1 Mb/s. The frequency band used for BLUETOOTH™ is the unlicensed ISM band at 2.4 GHz. The bandwidth occupied by a single hop channel is 1 MHz. The number of hop frequencies used in Europe and the U.S. is 79, which provides a spreading of 79 MHz in the 2.4 GHz ISM band. The BLUETOOTH™ radio can transmit with a power up to +20 dBm. However, when the radio is operated in the range from 0–20 dBm, adaptive power control is mandatory. The power control mechanism utilizes a closed loop control based on measurements done in the receiver. These signal strength measurements serve as the basis for requesting the sender to alternatively increase or decrease its transmit power.

As mentioned above, the BLUETOOTH™ piconet channel has a maximum instantaneous rate of 1 Mb/s. For systems using the 2.4 GHz ISM band, regulatory bodies like the FCC in the U.S. and ETSI in Europe restrict the bandwidth of a single hop channel to 1 MHz for a system using an average transmit power larger than 0.75 mW. In a bandwidth of 1 MHz, this regulatory restriction limits the feasible data rate to an upper limit of 2–3 Mb/s. In a BLUETOOTH™ piconet, the data rate is limited to 1 Mb/s.

However, there are many applications where a higher data rate is desired. Either direct-sequence spread spectrum (DSSS) has to be applied (on which no regulatory restrictions regarding bandwidth are put), or the system has to adhere to the restricted transmission power. However, DSSS systems are inappropriate for high-rate systems designed for ad-hoc connectivity. Since the symbols are spread with a chip sequence of at least length 10 (the FCC requires a 10 dB processing gain or more), the bandwidth of the spread signal is at least 10 times the signal bandwidth. When the signal bandwidth is already above several MHz in order to support the information rate of 5–10 Mb/s, the spread bandwidth becomes impractically broad.

In addition to this, DSSS systems are prone to near-far problems. If an interfering transmitter is closer than the intended transmitter, there is approximately only a 10 dB processing gain to reject the interferer. In ad hoc scenarios, the distances (and therefore propagation losses) vary widely and the DS processing gain is insufficient to handle the near-far issue.

For these reasons, the high-rate links are preferably provided by systems that do not use spreading. However, this means that the transmitted power in the available 1 MHz band will be restricted to 0.75 mW.

Dual-mode radios can therefore be provided, as illustrated in FIG. 1. These radios each have one mode of operation that supports the conventional FH radio with a maximum power level up to +20 dBm, and another mode of operation that supports the high-speed connections (5–10 Mb/s). The latter connection is only supported up to a maximum transmit power level of about 0.75 mW. This means that in one piconet, different ranges are supported.

In the system described in the above-referenced U.S. patent application Ser. No. 09/385,024, the high-speed (HS) mode can only be reached through the conventional FH mode. The HS mode described in that application only serves as an example. For purposes of the present discussion, any other HS mode can be used as well.

Figure 2A:
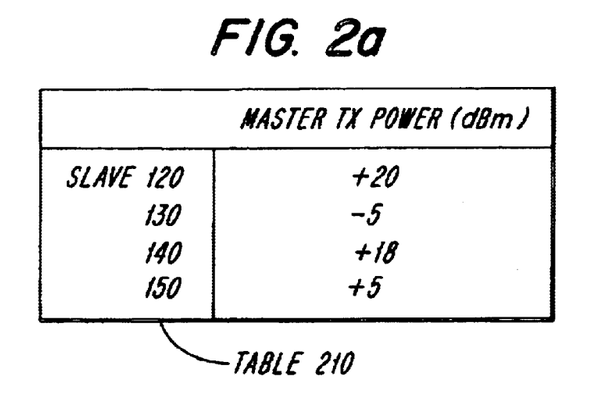
FIGS. 2a and 2b are tables showing power levels respectively transmitted and received for the different slaves illustrated in FIG. 1.
Figure 2B:
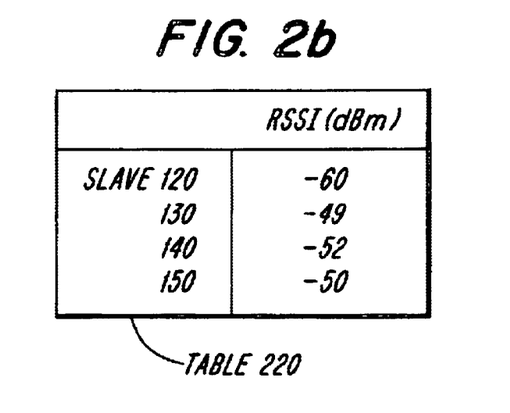

When two units that participate in a piconet desire to increase the speed of communications, they can request a high-speed channel. A distinction is made between an HS link connecting the master and the slave, and an HS link connecting two slaves. The tables shown in FIGS. 2a and 2b will be used to illustrate the HS link setup. In FIG. 2a, Table 210 shows exemplary transmission (TX) power levels that the master 110 might use for the different slaves illustrated in FIG. 1. In FIG. 2b, Table 220 shows exemplary received (RX) power levels (RSSI) as received at the master 110 for each of the slaves illustrated in FIG. 1. Since the master 110 applies power control (the use of power control for transmission power levels under 0 dBm is optional in the BLUETOOTH™ standard, but is assumed to be applied in this example), the TX levels differ for the different slaves. This is because the propagation conditions may be different for each slave. Propagation conditions are affected by differing distances between transmitter and receiver, as well as by obstacles that may block the direct line of sight. To illustrate the point, in FIG. 1, slave 120 is furthest away and requests the largest TX power. Slave 140 is behind an object 190 which attenuates the radio waves. Table 220 shows the average RSSI of the FH link, averaged over all hop channels. Tables 210 and 220 are both known in the master 110. The transmit power levels stated in Table 210 are those used by the master 110 to transmit to the slaves, and are therefore reflective of the propagation loss from the master 110 to the slaves. By contrast, the RSSI values stated in Table 220 are those measured by the master, and are therefore reflective of the propagation loss from the slave to the master 110. The RSSI is an average level, based on averaging over all the hop channels. Because of the closed-loop power control, the TX power is based on an averaged RSSI value as well. Because of this averaging, the propagation conditions can be assumed reciprocal, that is, the average propagation loss in the direction from master to slave will be equal to the average propagation loss in the direction from the slave to the master. In each slave, single-row tables, similar to Tables 210 and 220, can be established as well. Because of reciprocity, it can be assumed that the RSSI values measured at the slave are the same as the values in Table 220 and known by the master 110.

Figure 3:
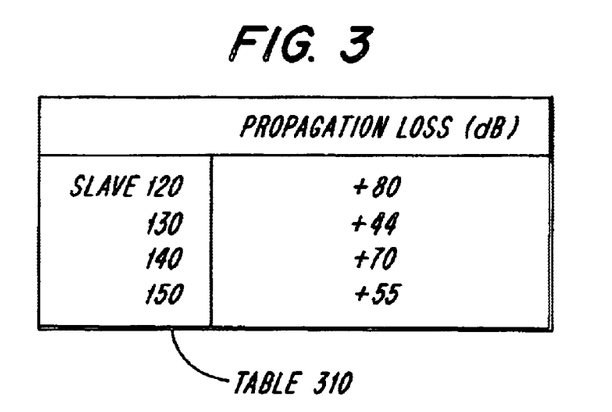
FIG. 3 is a table showing propagation losses derived from the tables shown in FIGS. 2a and 2b.

The master 110 can now obtain an indication of the propagation loss. By using Tables 210 and 220, and the reciprocity assumption (i.e., the assumption that a reciprocal power control mechanism is employed between the master 110 and the slaves, and that the path loss is reciprocal, that is, identical in both directions), the propagation loss to each slave can be derived. Exemplary propagation loss values, from the master 110 to a slave, are set forth in Table 310 in FIG. 3. These figures simply follow from the following equation for path loss, PL (in dB):

$$PL = P_{tx} - RSSI,$$

where $P_{tx}$ is the transmit power (as indicated in Table 210), and RSSI is the received signal strength indication (as indicated in Table 220). Again, this is an approximation based on the assumption that the slave's RSSI, as measured by the master 110, will be the same as the RSSI of the master's signal as received by the slave. Alternatively, one could view the transmit power level used by the master 110 as being representative of the transmit power level used by the slave, in which case the above equation is again a good representation of the path loss.

In alternative embodiments, it is possible to more accurately determine the path loss by having the slave actually report its transmission power level ($P_{tx\_slave}$), in which case the path loss is given by $$PL = P_{tx\_slave} - RSSI_{slave},$$

where $RSSI_{slave}$ is the value as measured at the master.

In other alternative embodiments, it is possible to more accurately determine the path loss by having the slave actually report to the master its measurement of the master's signal strength ($RSSI_{master}$), in which case the path loss is given by $$PL = P_{tx\_master} - RSSI_{master},$$

where $P_{TX\_master}$ is the transmit power level used by the master.

In accordance with one aspect of the invention, the master 110 can utilize the information contained in Table 310 to determine to which slave it can support an HS link. This determination is based on whether there would be a sufficient amount of power received by the recipient to support the low-power HS link. In making this determination, it is immaterial whether signal attenuation is attributable to a larger distance, the existence of an obstacle, or both. The propagation loss derived in Table 310 indicates whether the propagation conditions are favorable to support the HS link.

For example, suppose that the conventional FH link uses a TX power regulation scheme that seeks to maintain the recipient's RSSI level at a nominal value of −50 dBm. Table 220 shows that most of the exemplary FH links are operating at the proper operating point. However, for slave 120, the RSSI level is below the desired reference level. This is because for this particular slave 120, the applied TX power is already at the maximum possible value, that is, +20 dBm. When the TX power level reaches its maximum, the power control saturates. This situation is then reported to the corresponding unit when it requests an additional power increase. Knowing that the sender is already transmitting at the maximum power level, the recipient will stop requesting additional power increases. In the situation depicted, the RSSI level at −60 dBm is still sufficient to maintain an acceptable link quality. However, if the slave 120 were to move farther away from the master 110, the RSSI level would drop further, since there would be no way to increase the TX power to compensate for the increase in propagation loss. Eventually, the propagation loss would increase to a level that would require that the link be released.

Now, suppose that for the desired HS link, the received power level must be above −60 dBm (e.g., due to receiver sensitivity), and that the maximum power level that is allowed to be transmitted is −1 dBm. This means that the propagation loss cannot exceed −1−(−60)=59 dB. From the propagation loss table 310, the master 110 can now readily deduce which of the existing FH links can be replaced by a HS link. In this example, the links between the master 110 and the slaves 130 and 150 have propagation losses of +44 dB and +55 dB, respectively, and can therefore be replaced by HS links. By contrast, Table 310 shows that the links between the master 110 and the slaves 120 and 140 have propagation losses of +80 dB and +70 dB, respectively. Because these values are greater than the maximum propagation loss of 59 dB, neither of these FH links can be replaced by a HS link.

Figure 4:
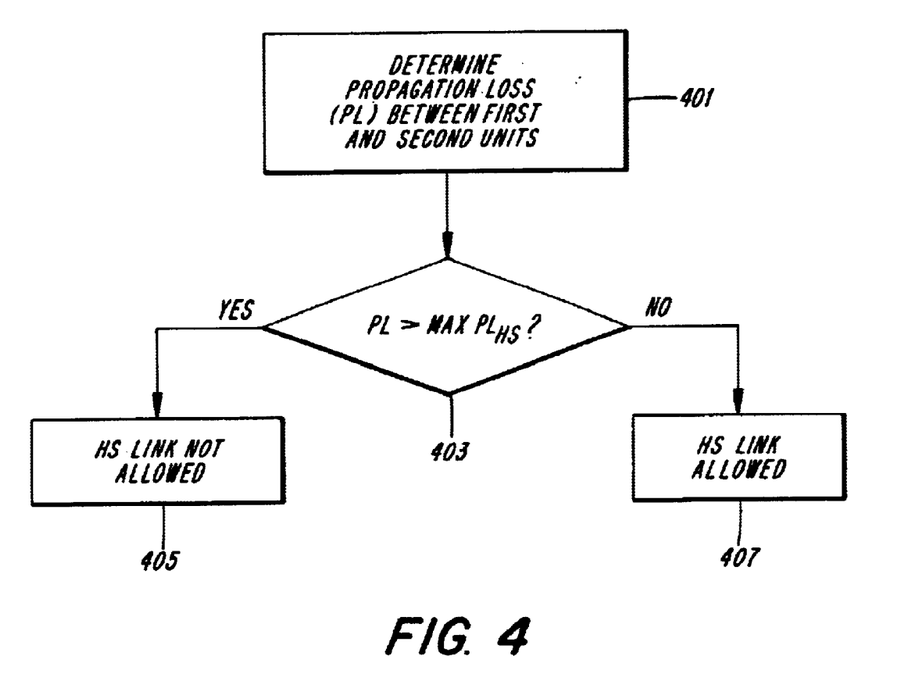
FIG. 4 is a flow chart showing techniques for determining whether an existing spreading-based link between two units can be replaced by a non-spreading-based high speed link.

The technique illustrated above will now be described with reference to the flowchart of FIG. 4. First, the propagation loss between first and second units (e.g., the master 110 and any one of the slaves 120, 130, 140, 150 illustrated in FIG. 1) is determined (step 401). This can be done by means of the exemplary techniques illustrated above with respect to the generation of the Table 310. However, use of these techniques is not essential to the invention. Any technique for determining the propagation loss between the two units in question may be used. As used throughout the specification, the term "determining" means not only ascertaining the actual propagation loss from one point to another, but also any other technique for obtaining a reasonable estimate of the propagation loss, including but not limited to techniques that make assumptions about the propagation loss being the same in both directions between the units in question.

Next, the propagation loss is compared to a maximum propagation loss value that is acceptable for maintaining the HS link ("Max $PL_{HS}$") (decision block 403). The value of Max $PL_{HS}$ may be predetermined based on known maximum TX power and receiver sensitivity, as illustrated in the example set forth above.

If the determined propagation loss value exceeds the Max $PL_{HS}$ value ("YES" path out of decision block 403), then the HS link cannot be supported, and appropriate steps are taken (step 405). Alternatively, if the determined propagation loss value does not exceed the Max $PL_{HS}$ value ("NO" path out of decision block 403), then the HS link can be supported, and appropriate steps are taken (step 407). Exactly what constitutes "appropriate steps" for each of steps 405 and 407 is application-dependent, and is therefore outside the scope of the invention.

Up to this point, the description has focused on links between a master and slave. However, a HS link between two or more slaves is also possible, such as that described in the above-referenced U.S. patent application Ser. No. 09/385,024. The procedure described above with respect to FIG. 4 can therefore be used to determine whether a HS link can be supported between two slave units. In carrying out the procedure under these circumstances, however, there is an added consideration. More particularly, since slaves do not communicate directly with one another, there is no prior knowledge about the propagation loss between them.

To address this additional consideration, another aspect of the invention relates to methods and apparatuses for determining the propagation loss between two slaves. Although the BLUETOOTH™ specifications do not allow slaves to directly communicate with each other, they do not forbid slaves from listening to other slaves when those other slaves transmit to the master. Thus, in accordance with this aspect of the invention, the master induces one slave to transmit. During this transmission, those other slaves that are interested listen to the transmitting slave and assess the link quality. This is described in greater detail below.

The protocol in the BLUETOOTH™ specification uses a kind of polling scheme. The channel is divided into time slots having a period of 625 μs. Each time slot is at a different hop frequency. The master and slaves alternate in transmitting and listening. For example, the channel can be arranged such that the master only transmits on even-numbered slots (with the slaves listening during these time slots), and the slaves only transmit on odd-numbered slots (with the master listening during these time slots). Because the master is the only unit permitted to transmit during the master-to-slave time slots, there is no possibility for collision (i.e., the occurrence of two or more units transmitting during the same time slot) with any other unit. To avoid collisions in the direction from the slaves to the master, the following polling rule is used: only the slave that is addressed in the preceding master-to-slave slot is allowed to transmit in the following slave-to-master slot. The slaves are addressed by a 3-bit slave address that is included in the packet header sent by the master during the master-to-slave time slot. Since all slaves can hear the master transmission (at least if the master uses a TX power level that is acceptable for even the slave with the largest propagation loss), they know in advance which slave is going to transmit in the next slave-to-master time slot. If the addressed slave is a potential slave to set up a HS link with, the non-addressed slaves listen to the addressed slave transmission as well. The non-addressed slaves can then determine the propagation loss, provided that certain procedures are followed. First, although it is not essential to practicing the invention, the RSSI related to the addressed slave's transmission should be averaged over a number of hop frequencies in order to filter out any frequency-selective-fading effects. Second, the addressed slave should transmit with a power level known to the other slave(s).

Figure 5:
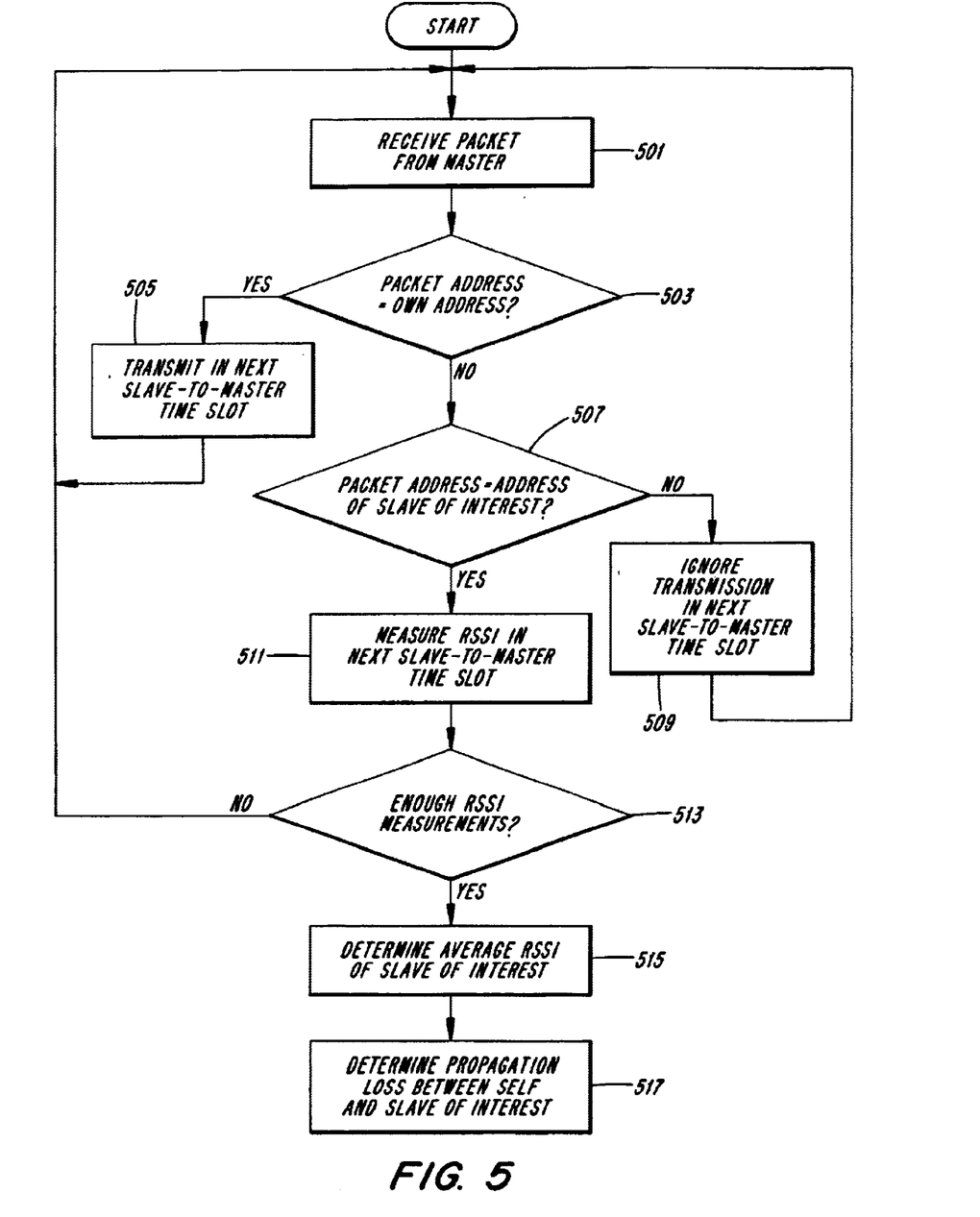
FIG. 5 is a flow chart that depicts the procedures followed by a slave that wants to determine the propagation loss between itself and another slave (the "slave of interest") operating in the same piconet, in accordance with an aspect of the invention.

FIG. 5 is a flow chart that depicts the procedures followed by a slave that wants to determine the propagation loss between itself and another slave (the "slave of interest") operating in the same piconet. The procedure includes receiving a packet from the master 110 during a master-to-slave time slot (step 501). The slave then examines the packet address to determine whether it is the intended recipient of the packet (decision block 503). If the packet address matches the slave's own address ("YES" block out of decision block 503), then the slave transmits during the next slave-to-master time slot (step 505). The slave then repeats the procedure, beginning again at step 501.

Returning to decision block 503, if the packet address does not match the slave's own address ("NO" block out of decision block 503), then the packet address is compared with the address (or addresses) of the slave (or slaves) of interest (decision block 507). If the packet address does not match the address of any slave of interest ("NO" path out of decision block 507), then the slave ignores the transmission that occurs in the next slave-to-master time slot (step 509), and repeats the procedure, beginning again at step 501.

If, however, the packet address does match the address of a slave of interest ("YES" path out of decision block 507), then the slave performing the procedure measures the RSSI of the packet that is transmitted in the next slave-to-master time slot (step 511). Next, it is determined whether enough RSSI measurements of the slave of interest have been made to generate a good estimate of the RSSI (decision block 513). The number of measurements that are necessary to satisfy this criterion is application specific, and may be any number greater than or equal to one.

If enough measurements have not yet been made ("NO" path out of decision block 513), then the process of measuring the RSSI for the slave of interest continues by repeating the procedure, beginning again at step 501.

If, however, enough RSSI measurements have been made ("YES" path out of decision block 513), then an average RSSI measurement is determined from the set of RSSI measurements (step 515). Utilizing the average RSSI measurement and knowledge about the TX power level utilized by the slave of interest, the slave performing the procedure is able to determine the propagation loss between itself and the slave of interest (step 517).

The above-described process of making a plurality of RSSI measurements and determining an average RSSI measurement made no distinction between what frequencies were being used by the transmitting slave. In alternative embodiments, measuring RSSI and determining an average RSSI can be performed only for those frequencies that are to be used by the HS channel. For example, the master 110 may send a message to the slaves indicating which carriers are used for the HS channel. The hopping slaves in this case would only measure the RSSI of other slaves' transmissions when the hop coincides with this HS frequency window. In these embodiments, it is still beneficial to make repeated measurements and average these in order to reduce noise. However, the averaging no longer has to be relied on to account for frequency dependency.

An example will illustrate the procedure. In the piconet shown in FIG. 1, suppose that the slaves 130 and 150 desire to establish a HS link with one another. Prior to establishment of this slave-to-slave HS link, the slaves communicate with each other via the master 110. This enables them to exchange information regarding their capabilities (e.g., dual-mode or not). If they intend to establish the HS link, the master 110 is informed. The master 110 then communicates with the slaves 130, 150 using a power level that is the maximum level used for the one of the two slaves with the largest propagation loss. Use of this power level ensures that both slaves will be able to hear the master 110 when it sends packets to either of the slaves. For the exemplary configuration depicted in FIG. 1, Table 210 (FIG. 2a) indicates which power level will be used. Since slave 130 only requires use of a TX power level of −5 dBm, whereas slave 150 requires use of a TX power level of +5 dBm, the output power used by the master 110 during this procedure is +5 dBm (i.e., the larger of the two). In an alternative embodiment, the master's TX power level can instead be set to a fixed level that either equals or exceeds the maximum powers required to obtain acceptable reception. In the current example, the master may for example choose a TX power level of +20 dBm, which exceeds both the −5 dBm and +5 dBm required for acceptable reception.

When either of the slaves 130 and 150 transmits, it should respond with a power level equal to or exceeding the maximum power level allowed on the HS link. This is because the slave power level must be sufficient to give acceptable performance in the master receiver. In this example, the maximum power transmitted on the HS link is −1 dBm, whereas the slaves 130 and 150 have to send at −5 dBm and +5 dBm, respectively, for acceptable reception. Therefore, the slave power transmission is max(−5,−1)=−1 dBm for slave 130 and max(+5,−1)=+5 dBm for slave 150. The master 110 then informs slave 130 of the TX power used by slave 150, and similarly informs slave 150 of the TX power used by slave 130. In an alternative embodiment, it can be decided that both slaves will use a fixed power level during this procedure, wherein the fixed power level is either equal to or exceeds the maximum powers required to obtain acceptable reception. For example, both slaves might use +20 dBm when transmitting their responses to the master 110.

Figure 6:
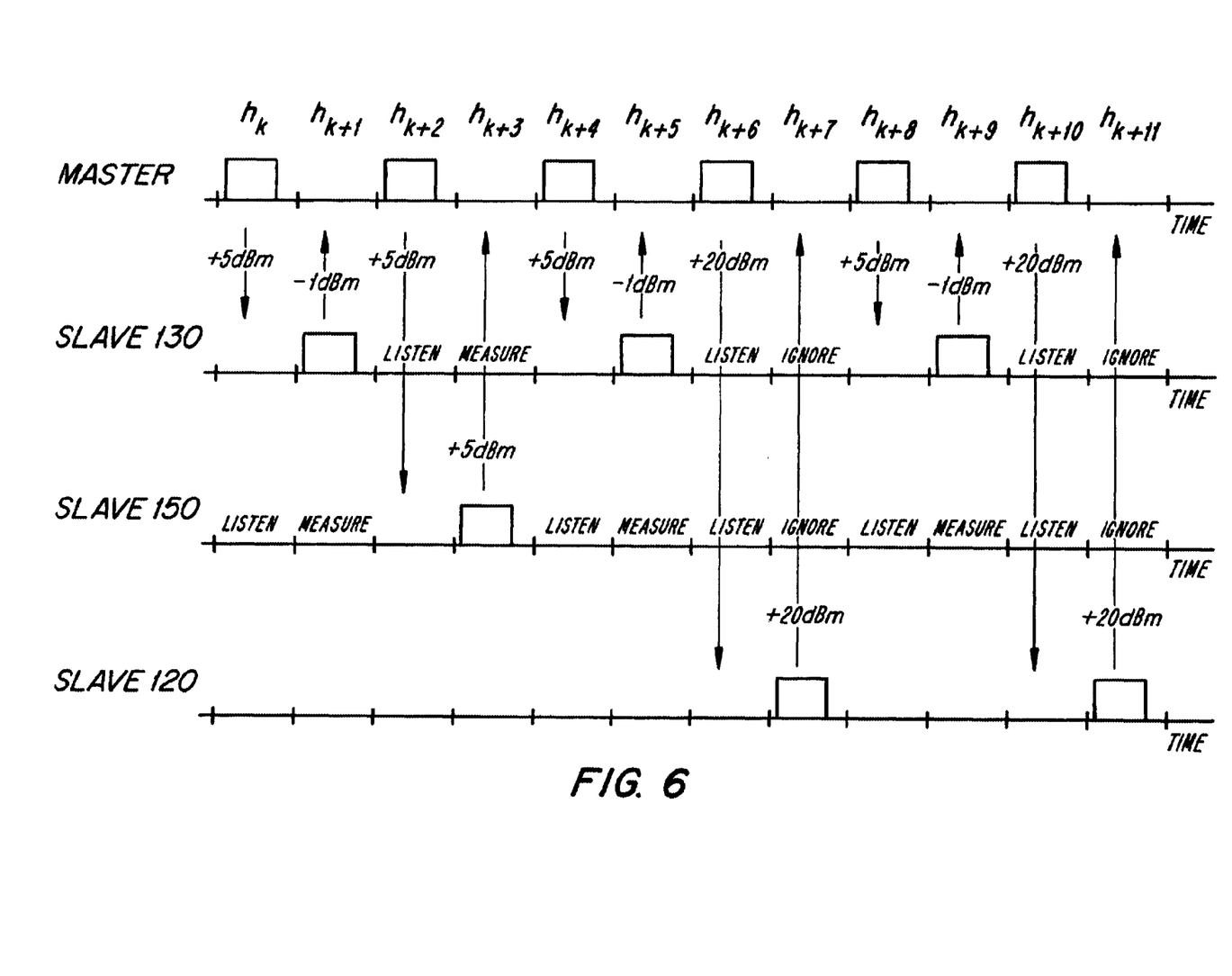
FIG. 6 is a timing diagram that illustrates exemplary traffic behavior during a measurement procedure in accordance with an aspect of the invention.

The slaves should then be informed when this "measuring" procedure starts, at which time the TX power levels are adjusted as described above. Note that the information exchanged over the links during the measuring procedure need not be related to the measuring procedure. The measuring procedure should be sufficiently long such that the measured RSSI can be averaged over a number of hop frequencies. (As mentioned above, in some embodiments measurements may be made only in the frequency window envisioned for the HS link.) In addition, there should be sufficient traffic to have the transceivers transmit packets, otherwise dummy "measurement" packets should be sent. The measurement procedure is depicted in FIG. 6. Here, twelve hops, denoted $h_k$ through $h_{k+11}$, are shown. In the even-numbered slots, the master 110 transmits to one of three slaves 130, 150 and 120. The TX power levels used by the master during each of these transmissions is shown as well. In the odd-numbered hops, an addressed one of the three slaves 130, 150 and 120 transmits to the master 110. The TX power level used by the transmitting slave is also shown. Note that the slave address in the master packet (as well in the slave's return packet) indicates which slave is concerned so that the RSSI measurements can be averaged over the same slave. Consequently, slave 130, which is interested in establishing a HS link with slave 150 but not slave 120, knows that it should measure during hops $h_{k+3}$, and ignore the slave transmissions that occur at hops $h_{k+7}$ and $h_{k+11}$. Slave 150 similarly uses the slave address information contained in the master packets (as well as in the slave's return packets) to know that it should measure during slave 130's transmissions at hops $h_{k+1}$, $h_{k+5}$, and $h_{k+9}$, and that it should ignore the slave transmissions that occur at hops $h_{k+7}$ and $h_{k+11}$. Note that during the measurement procedure, the transmit powers should be fixed. One way to do this is by disabling the power control mechanism, at least for the duration of the measurement procedure.

The determination of propagation loss between the slaves, and subsequent determination of whether a HS link can be used between them, proceeds as follows. Suppose that slave 130 transmitted at −1 dBm during the measurement procedure and that slave 150 transmitted at +5 dBm. Also suppose that the RSSI measured in slave 130 during slave's 150 transmissions is −50 dBm. As a consequence, the propagation loss from slave 150 to slave 130 is +5−(−50)=55 dB.

Since reciprocal propagation behavior is presumed, the expected RSSI measured in slave 150 during slave's 130 transmissions is approximately −1−55=−56 dBm. Since the propagation loss of 55 dB is less than the maximum loss of 59 dB where the HS link is still assumed to operate, it can be concluded that a HS communication link between slaves 130 and 150 is possible.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the above-described embodiments illustrate the various aspects of the invention as they may be applied to a radio communication system operating in accordance with BLUETOOTH™ standards. However, this is not an essential aspect of the invention. To the contrary, the various inventive features may easily be applied in radio communication systems operating in accordance with other standards, without departing from the concepts and principles described above.

Moreover, the above-described embodiments illustrate the various aspects of the invention as they may be applied to a radio communication system in which it is the maximum permissible transmission power level that determines the transmission range (i.e., the maximum operational distance between the transmitter and a receiver), and thereby also whether an HS link can be supported. However, the transmission range need not be determined by the transmission power level, but by other parameters that make up a so-called "link budget". For example, the sensitivity of the receiver also can determine, for a given transmission power level, whether a particular transmission range can be supported (i.e., the more sensitive the receiver is, the farther the transmission range). The sensitivity of the receiver can, for example, be a function of the type of modulation that is employed. To illustrate this point, the use of Binary Phase Shift Keying (BPSK) allows a receiver to have a higher sensitivity (and hence a larger operational distance from the transmitter) than does the use of Quadrature Amplitude Modulation (QAM). Thus, the invention provides the ability to determine whether a first kind of communication link can be supported between a first unit and a second unit, wherein the first kind of communication link does not support a transmission range above a first maximum value, and the second kind of communication link does. Support (or lack thereof) of the transmission range above the first maximum value can be due to factors including, but not limited to, maximum permissible transmission power level, receiver sensitivity, and type of modulation employed. These factors can be responsible for transmission range either alone, or in combination with one or more other factors.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining whether a first kind of communication link can be supported between a first unit and a second unit, wherein the first kind of communication link does not support a transmission range above a first maximum value, the method comprising:

using a second kind of communication link to determine a propagation loss value between the first unit and the second unit, wherein the second kind of communication link supports the transmission range above the first maximum value; and using the propagation loss value to determine whether the first kind of communication link can be supported between the first unit and the second unit.

2. The method of claim 1, wherein the step of using the propagation loss value to determine whether the first kind of communication link can be supported between the first unit and the second unit comprises:

using the propagation loss and a maximum transmission power level associated with the first maximum value to estimate a received signal strength value;

determining that the first kind of communication link cannot be supported between the first unit and the second unit if the estimated received signal strength value is below a predetermined value; and determining that the first kind of communication link can be supported between the first unit and the second unit if the estimated received signal strength value is not below the predetermined value.

3. The method of claim 1, wherein the first kind of communication link does not include use of spread spectrum techniques, and the second kind of communication link does include use of a spread spectrum technique.

4. The method of claim 1, wherein the first kind of communication link provides a higher rate of data transmission than does the second kind of communication link.

5. The method of claim 1, wherein using the second kind of communication link to determine the propagation loss value between the first unit and the second unit comprises:

in the first unit, measuring a received signal strength value of a signal transmitted by the second unit; and determining the propagation loss value between the first unit and the second unit as a function of the measured received signal strength value and a transmission power level used by the second unit.

6. The method of claim 5, wherein the first unit is a master unit and the second unit is a slave unit.

7. The method of claim 6, wherein the master unit and the slave unit communicate in accordance with BLUETOOTH™ standards.

8. The method of claim 5, wherein:

the first unit is a first slave unit in a piconet;

the second unit is a second slave unit in the piconet; and the signal transmitted by the second unit is transmitted to a master unit in the piconet.

9. The method of claim 8, wherein the step of, in the first unit, measuring the received signal strength value of the signal transmitted by the second unit comprises:

in the first unit, receiving a first packet transmitted by the master unit;

determining whether a packet address included in the first packet identifies the second slave unit; and conditionally measuring the received signal strength value of a second packet transmitted in a next time slot if the packet address included in the first packet identifies the second slave unit.

10. The method of claim 8, wherein the piconet operates in accordance with BLUETOOTH™ standards.

11. A method of determining a propagation loss value between a first slave unit in a piconet and a second slave unit in the piconet, the method comprising:

a) in the first unit, receiving a first packet transmitted by a master unit in the piconet;

b) determining whether a packet address included in the first packet identifies the second slave unit;

c) conditionally measuring the received signal strength value of a second packet transmitted in a next time slot if the packet address included in the first packet identifies the second slave unit; and d) if the received signal strength value was measured, then determining propagation loss as a function of the measured received signal strength value and a value representative of a transmit power level used by the second unit.

12. The method of claim 11, wherein the piconet operates in accordance with BLUETOOTH™ standards.

13. The method of claim 11, further comprising:

repeating steps a), b), and c) a sufficient number of times to generate a plurality measured received signal strength values; and generating an average measured received signal strength value from the plurality of measured received signal strength values, and wherein, the step of determining propagation loss as a function of the measured received signal strength value and the value representative of the transmit power level used by the second unit comprises determining propagation loss as a function of the average measured received signal strength value and the value representative of the transmit power level used by the second unit.

14. An apparatus that determines whether a first kind of communication link can be supported between a first unit and a second unit, wherein the first kind of communication link does not support a transmission range above a first maximum value, the apparatus comprising:

logic that uses a second kind of communication link to determine a propagation loss value between the first unit and the second unit, wherein the second kind of communication link supports the transmission range above the first maximum value; and logic that uses the propagation loss value to determine whether the first kind of communication link can be supported between the first unit and the second unit.

15. The apparatus of claim 14, wherein the logic that uses the propagation loss value to determine whether the first kind of communication link can be supported between the first unit and the second unit comprises:

logic that uses the propagation loss value and a maximum transmission power level associated with the first maximum value to estimate a received signal strength value; and logic that determines that the first kind of communication link cannot be supported between the first unit and the second unit if the estimated received signal strength value is below a predetermined value, and alternatively determines that the first kind of communication link can be supported between the first unit and the second unit if the estimated received signal strength value is not below the predetermined value.

16. The apparatus of claim 14, wherein the first kind of communication link does not include use of spread spectrum techniques, and the second kind of communication link does include use of a spread spectrum technique.

17. The apparatus of claim 14, wherein the first kind of communication link provides a higher rate of data transmission than does the second kind of communication link.

18. The apparatus of claim 14, wherein the logic that uses the second kind of communication link to determine the propagation loss value between the first unit and the second unit comprises:

in the first unit, logic that measures a received signal strength value of a signal transmitted by the second unit; and logic that determines the propagation loss value between the first unit and the second unit as a function of the measured received signal strength value and a transmission power level used by the second unit.

19. The apparatus of claim 18, wherein the first unit is a master unit and the second unit is a slave unit.

20. The apparatus of claim 19, wherein the master unit and the slave unit communicate in accordance with BLUETOOTH™ standards.

21. The apparatus of claim 18, wherein:

the first unit is a first slave unit in a piconet;

the second unit is a second slave unit in the piconet; and the signal transmitted by the second unit is transmitted to a master unit in the piconet.

22. The apparatus of claim 21, wherein the logic that, in the first unit, measures the received signal strength value of the signal transmitted by the second unit comprises:

in the first unit, logic that receives a first packet transmitted by the master unit;

logic that determines whether a packet address included in the first packet identifies the second slave unit; and logic that conditionally measures the received signal strength value of a second packet transmitted in a next time slot if the packet address included in the first packet identifies the second slave unit.

23. The apparatus of claim 21, wherein the piconet operates in accordance with BLUETOOTH™ standards.

24. An apparatus that determines a propagation loss value between a first slave unit in a piconet and a second slave unit in the piconet, the apparatus comprising:

a) in the first unit, logic that receives a first packet transmitted by a master unit in the piconet;

b) logic that determines whether a packet address included in the first packet identifies the second slave unit;

c) logic that conditionally measures the received signal strength value of a second packet transmitted in a next time slot if the packet address included in the first packet identifies the second slave unit; and d) logic that determines propagation loss as a function of the measured received signal strength value and a value representative of a transmit power level used by the second unit if the received signal strength value was measured.

25. The apparatus of claim 24, wherein the piconet operates in accordance with BLUETOOTH™ standards.

26. The apparatus of claim 24, further comprising:

logic that operates elements a), b) and c) a sufficient number of times to generate a plurality measured received signal strength values; and logic that generates an average measured received signal strength value from the plurality of measured received signal strength values, and wherein, the logic that determines propagation loss as a function of the measured received signal strength value and the value representative of the transmit power level used by the second unit comprises logic that determines propagation loss as a function of the average measured received signal strength value and the value representative of the transmit power level used by the second unit.

* * * * *